United States Patent [19]
Huber

[11] Patent Number: 5,268,910
[45] Date of Patent: Dec. 7, 1993

[54] SUPERLUMINESCENT OPTICAL SOURCE

[75] Inventor: David R. Huber, Warrington, Pa.

[73] Assignee: General Instrument Corporation, Hatboro, Pa.

[21] Appl. No.: 919,922

[22] Filed: Jul. 27, 1992

Related U.S. Application Data

[63] Continuation-in-part of Ser. No. 732,097, Jul. 18, 1991, Pat. No. 5,191,586.

[51] Int. Cl.[5] .............................................. H01S 3/30
[52] U.S. Cl. .......................................... 372/6; 372/41; 372/102; 372/703; 372/20
[58] Field of Search ................. 372/6, 20, 41, 102, 372/703, 39; 330/4.3

[56] References Cited

U.S. PATENT DOCUMENTS

| | | | |
|---|---|---|---|
| 4,794,615 | 12/1988 | Berger | 372/71 |
| 4,923,279 | 5/1990 | Ainslie et al. | |
| 5,005,115 | 4/1991 | Desurvire et al. | 330/4.3 |
| 5,134,620 | 7/1972 | Huber | 372/6 |
| 5,140,456 | 8/1992 | Huber | 372/6 |
| 5,159,601 | 10/1992 | Huber | 372/6 |

FOREIGN PATENT DOCUMENTS

| | | |
|---|---|---|
| 372907 | 6/1990 | European Pat. Off. |
| 91/04594 | 4/1991 | PCT Int'l Appl. |
| 2227359 | 7/1990 | United Kingdom |

OTHER PUBLICATIONS

Patent Abstracts of Japan, vol. 13, No. 453, Publication No. JP1175787, published Oct. 11, 1989.
R. Allen, et al., "Cascade Thulium Fiber Laser," *Conference on Lasers and Electro-Optics*, 1992 Technical Digest Series, vol. 12, Conference Edition, Optical Society of America, May 10-15, 1992, Paper No CThQ4, pp. 542-543.

*Primary Examiner*—Leon Scott, Jr.
*Attorney, Agent, or Firm*—Barry R. Lipsitz

[57] ABSTRACT

An optical source particularly suitable as a pump is provided. A gain medium such as a thulium doped fiber has an input end and an output end. The input end is optically coupled to a reflector to cause spontaneous emissions within a predetermined band exiting the input of the gain medium to be reflected back into the medium. Spontaneous emissions outside of the predetermined band are lost. An optical isolator can be provided to prevent the optical source from lasing, resulting in a moderate bandwidth optical pump. A cascaded embodiment is disclosed, in which the gain medium is followed by an optical amplifier for increased power.

20 Claims, 3 Drawing Sheets

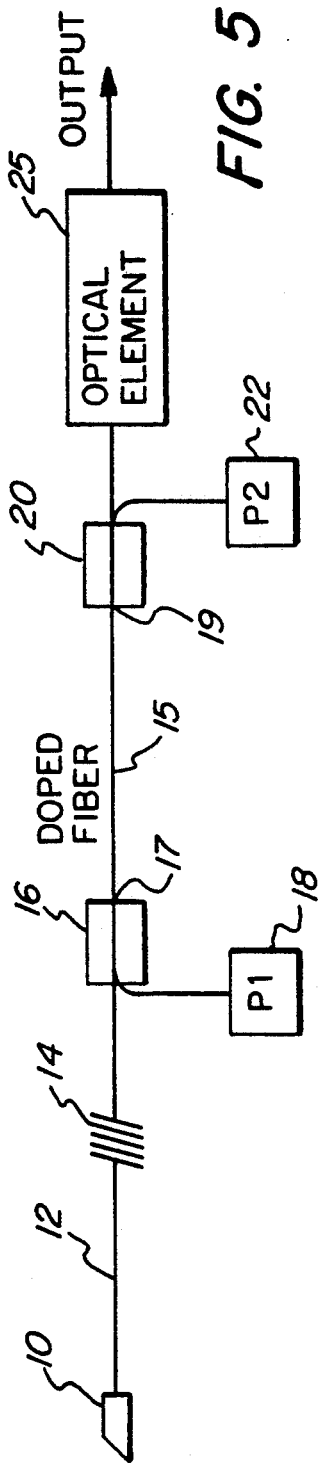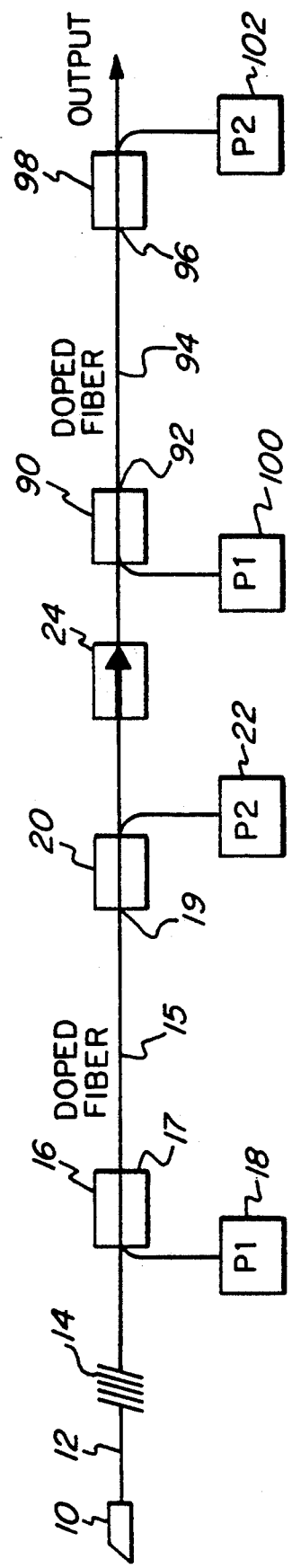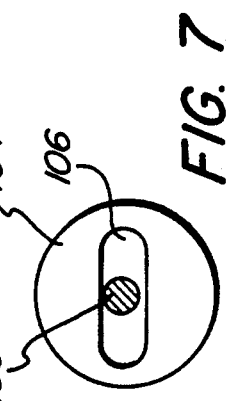

SUPERLUMINESCENT OPTICAL SOURCE

This application is a continuation-in-part of copending U.S. patent application Ser. No. 07/732,097 filed on July 18, 1991, now U.S. Pat. No. 5,191,586.

BACKGROUND OF THE INVENTION

The present invention relates to optical communication systems, and more particularly to a superluminescent source useful, e.g., for providing optical energy to carry information signals or to pump active optical components.

The optical communications field is expanding at a rapid pace. Telecommunication, sensors, medical and video transmission can all take advantage of optical technology, particularly where virtually unlimited bandwidth and low attenuation are beneficial. Cable television systems are one example where optical fiber technology is providing efficient and economical alternatives to prior coaxial cable distribution schemes.

Fiber optic communication systems which utilize direct detection of information signals that are modulated on a carrier do not require a coherent light source such as that produced by a laser. Lasers are used, however, because they are readily available and provide a convenient source of high intensity light. However, lasers tend to be expensive and have various operational drawbacks that render them less than optimum for use in the field.

Other light sources, such as the light emitting diode (LED) and the superluminescent diode (SLD) have shown promise as carrier generators for fiber transmission. A basic measure of the usefulness of such incoherent sources for optical communication applications is the radiance (or brightness) of the source as measured in watts of optical power radiated into a unit solid angle per unit area of the emitting surface. To be useful for fiber transmission applications, an incoherent light source must have a high radiance and operate with a narrow bandwidth. Although LEDs and SLDs are known with relatively high radiance parameters, narrow spectral widths of about 1 angstrom (Å) have not previously been disclosed.

When both spontaneous and stimulated emission occur in an LED, its output can be of narrower spectral width and higher radiance than if spontaneous emission alone exists. Such "superluminescent" devices have achieved spectral widths of 20 Å under pulsed operation with a very high pulsed driving current. SLDs with narrower spectral widths are not currently available.

It would be advantageous to provide a versatile light source for use in fiber optic communication systems. It would be further advantageous to provide a superluminescent light source for such purposes, having a narrow line width of about 1 Å. Such a light source should be capable of providing a plurality of optical carriers for use in transmitting separate information signals over an optical communication path. Such a light source should alternatively be capable of providing pump energy for use by one or more active optical devices such as optical amplifiers or lasers. The present invention provides various embodiments of such an optical source.

SUMMARY OF THE INVENTION

In accordance with the present invention, an optical source is provided. A thulium doped optical fiber having an input end and an output end is pumped to cause spontaneous emission. The spontaneous emission is output from said output end for use as an optical carrier to carry information signals, or for use as a pump source to pump, e.g., an optical amplifier or a laser. Reflector means are provided for reflecting light over a limited bandwidth encompassing a desired wavelength of said spontaneous emission. Means are provided for optically coupling the reflector means to the input end of said doped fiber to reflect spontaneous emissions within said limited bandwidth that exit the input end of said doped fiber back into said doped fiber for output from said output end. Light outside of said limited bandwidth is not reflected back into said doped fiber.

The reflector means can comprise an optical fiber grating, such as an in-fiber grating formed using well known photorefractive techniques. Assuming that the spontaneous emission occurring in the doped fiber has a bandwidth $\beta$, the reflector means can be constructed to set its optical bandwidth to no more than about ten percent of the bandwidth $\beta$. This will result in an output signal from the optical source which has a moderate bandwidth that is useful in enabling relatively high optical power output, without reaching the threshold for stimulated Brillouin scattering when carried over an optical fiber. Since Brillouin threshold is a function of the spectral density of the source, high power can be transmitted if the source has a moderate spectrum.

An optical amplifier can be coupled to the output end of said doped fiber for increasing the power provided by said optical source. For example, a thulium doped fiber amplifier can be used for this purpose.

Where an incoherent pump source is desired, optical isolator means can be coupled to the output end of the doped fiber for preventing the fiber from lasing. On the other hand, when laser operation of the source is desired, reflector means can be coupled to the output end of the doped fiber for causing said fiber to lase. In either case, the reflector (e.g., grating) at the input end of the doped fiber provides the limited bandwidth reflection necessary to achieve a desired output.

In a specific illustrated embodiment, the desired operating wavelength is about 1.46 microns and the rare earth is thulium. The pumping means pump the thulium doped fiber at a wavelength of about 0.79 microns.

Although not necessary, the optical source can comprise a multicore optical fiber. In this instance, the doped optical fiber is provided as an inner core of the multicore fiber. The pump means include an outer core of the multicore fiber for carrying pump energy to the inner core.

BRIEF DESCRIPTION OF THE DRAWINGS

FIG. 5 is a schematic diagram of an embodiment of the source which is particularly useful as an optical pump and can be configured to lase or not to lase;

FIG. 6 is a schematic diagram of an optical source followed by an optical fiber amplifier in accordance with the present invention; and FIG. 7 is an end view illustration of a multicore containing a doped fiber inner core that can in accordance with the present invention.

DETAILED DESCRIPTION OF THE INVENTION

Figure 1:
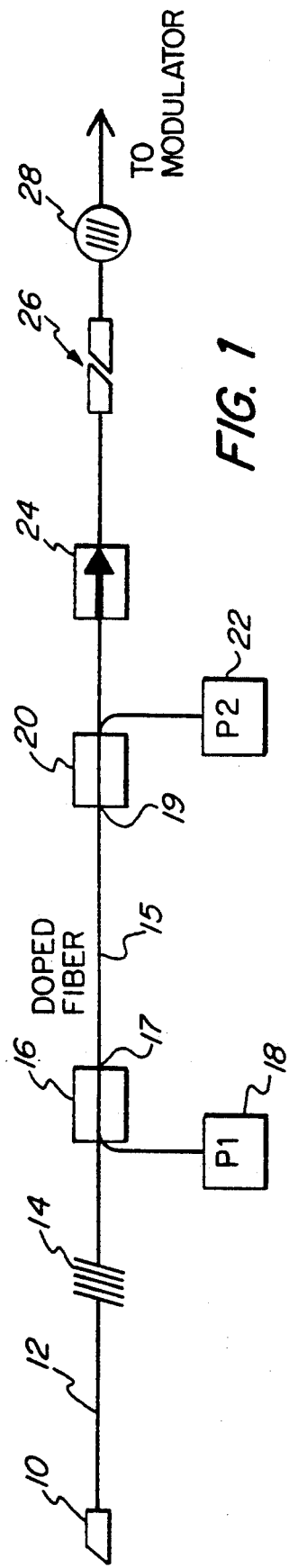
FIG. 1 is a schematic diagram of a narrow band incoherent superluminescent source in accordance with the present invention.

A schematic diagram of a superluminescent source that provides an incoherent optical carrier in accordance with the present invention is illustrated in FIG. 1. A gain medium comprising a doped fiber 15 is pumped at an input end 17 thereof by a first pump laser 18 via a pump signal multiplexer 16. In the illustrated embodiment, the gain medium is also pumped at an output end 19 thereof by a pump laser 22 via a pump signal multiplexer 20. The pump signal multiplexers 16, 20 are conventional components well known in the art. It should be appreciated that the gain medium only has to be pumped at one end, and the pumping at both ends as shown in the FIGURES is optional.

Any solid-state laser material can be used to provide the gain medium. In a first preferred embodiment in which an optical carrier generator is provided, an erbium fiber is used for the gain medium. In a second preferred embodiment in which a pump source is provided, a thulium fiber is used for the gain medium. Fibers doped with other rare earth materials, such as neodymium, can alternatively be used for doped fiber 15. As is well known in the art, a gain medium comprising an erbium doped fiber can be used with a pump laser operating at either 980 nanometers (nm) or 1480 nm. A neodymium doped fiber will operate with an 807 nm pump laser. It has recently been demonstrated that thulium has a transition at 1460 nm. R. Allen, L. Esterowitz and I.Aggarwal, "Cascade Thulium Fiber Laser," *Conference on Lasers and Electro-Optics,* 1992 Technical Digest Series, Vol. 12, Paper CThQ4, May 10–15, 1992, Anaheim, California, pp. 542–543. A pump wavelength of 790 nm is suitable for a thulium optical source.

In FIG. 1, all fiber except the doped fiber 15 is standard 1300 nm or 1500 nm single mode fiber if the pump laser is operating near 1480 nm. If the gain medium is pumped at 980 nm, with an erbium doped fiber 15, the fibers transporting pump light to the erbium fiber may be designed for single mode operation at 980 nm.

In accordance with the present invention, a reflector, such as a fiber grating 14, is coupled via multiplexer 16 to the input end 17 of doped fiber 15. Fiber grating 14 is a reflection device with a desired reflection band. For example, reflection grating 14 can be a grating that has a bandwidth of approximately 1 Å for reflecting light at approximately 1550 nm.

Pumping the gain medium with pump laser 18 and/or pump laser 22 will cause spontaneous emission to occur in the gain medium (doped fiber 15) as well known in the art. The spontaneous emission propagating from the gain medium toward reflector 14 will exit the input end 17 of the doped fiber via multiplexer 16. Most of the spontaneous emissions will continue past reflector 14 to optical fiber 12, and will exit the superluminescent source via a conventional slant polish connector 10. In accordance with the present invention, the spontaneous emission in the reflection band of grating 14 that exits input end 17 of doped fiber 15 will be reflected back to the gain medium. The reflected energy within the reflection band will pass back into doped fiber 15 via multiplexer 16.

Upon its return to the gain medium, the reflected energy within the reflection band of reflector 14 will be amplified. Since the gain of a doped fiber is generally on the order of 30 dB or more, this amplification will be substantial. The amplified energy will then be output from the gain medium at its output end 19. The energy output from output end 19 is coupled to an optical isolator 24 to prevent the amplified energy from reflecting back into the doped fiber 15 via multiplexer 20, so that the gain medium does not lase.

After passing through optical isolator 24, the energy exits the superluminescent source at a slant polish connector generally designated 26, for use as an incoherent optical carrier. Prior to inputting the carrier to an external modulator, it can be polarized by a conventional polarizer 28. Some types of external modulators, such as a lithium niobate Mach Zehnder modulator, require polarized light.

The optical carrier produced by the superluminescent source illustrated in FIG. 1 of the present invention comprises high intensity light at a nominal bandwidth of 1 Å. The dispersion of the 1 Å wide light is minimal. Accordingly, the optical carrier is suitable for use with AM-VSB (vestigial sideband) signals, such as standard cable television signals. The carrier will also work well for digital pulse code modulation (PCM) communications, as long as extremely long transmission distances are not required. In order to extend the range of a carrier generated in accordance with the present invention, a number of stages of cascaded doped fiber optical amplifiers can be utilized.

The output power of the superluminescent source at coupler 26 is limited by the pump power of pump laser 18 and/or pump laser 22. Power conversion efficiencies on the order of 95% are achievable after correction for photon quantum efficiency.

Figure 2:
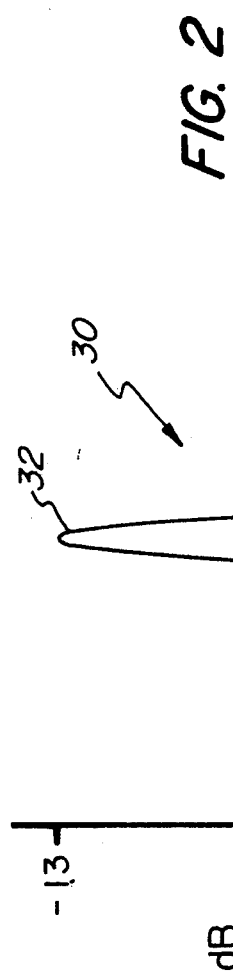
FIG. 2 is a graphical representation of the output of the superluminescent source of FIG. 1.

FIG. 2 illustrates the output of the superluminescent source. The output energy spectrum 30 exhibits a peak 32 at about 1547 nm for an erbium fiber implementation. Experimental data has shown that the bandwidth of the peak 32 can be designed to be extremely narrow, e.g., on the order of 13 GHz, as compared to previously known superluminescent sources. However, it may be necessary to use a somewhat broader bandwidth to maintain relative intensity noise (RIN) at an acceptable level for optical signal communication. Energy that is about 10 dB down from the peak 32 results from photons outside of the desired band which propagate toward the output end 19 of the gain medium and are amplified therein.

Figure 3:
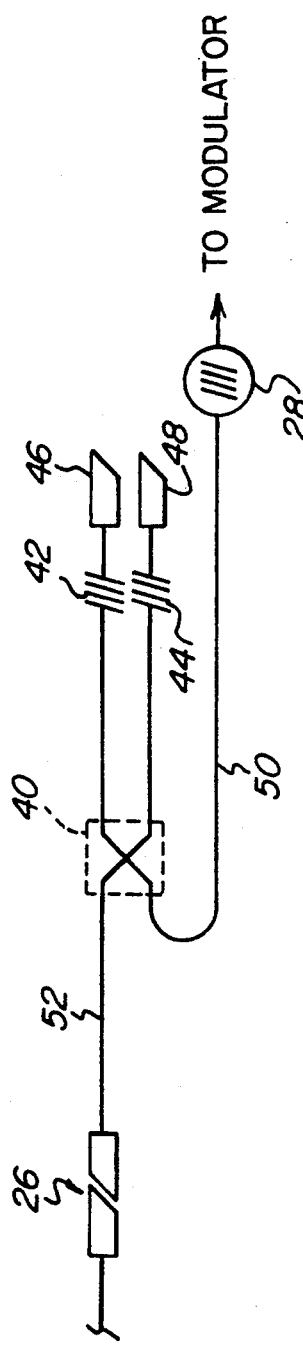
FIG. 3 schematic diagram of a filter that can be used to filter the output of the superluminescent source prior to an external modulator.

In order to improve the response of the superluminescent source of FIG. 1, filtering can be provided to filter undesired spontaneous emissions that exit from the output end 19 of the gain medium. A filter such as that illustrated in FIG. 3 can be used to pass only the desired spontaneous emissions in peak 32 of the response curve 30 illustrated in FIG. 2. The filter of FIG. 3 can be inserted between coupler 26 and polarizer 28 of FIG. 1.

The filter is constructed by coupling a pair of gratings 42, 44 to a conventional 2×2 coupler 40. Gratings 42, 44 are matched in reflection band to grating 14 illustrated in FIG. 1. This configuration can be viewed as a balanced resonant Michelson interferometer. Light outside the reflection band of gratings 42, 44 is lost via slant polish connectors 46, 48 respectively. Light within the reflection band is routed to optical fiber 50 because the balanced interferometer provides the desired phase shift for almost 100% transmission from optical fiber 52 to optical fiber 50.

Figure 4:
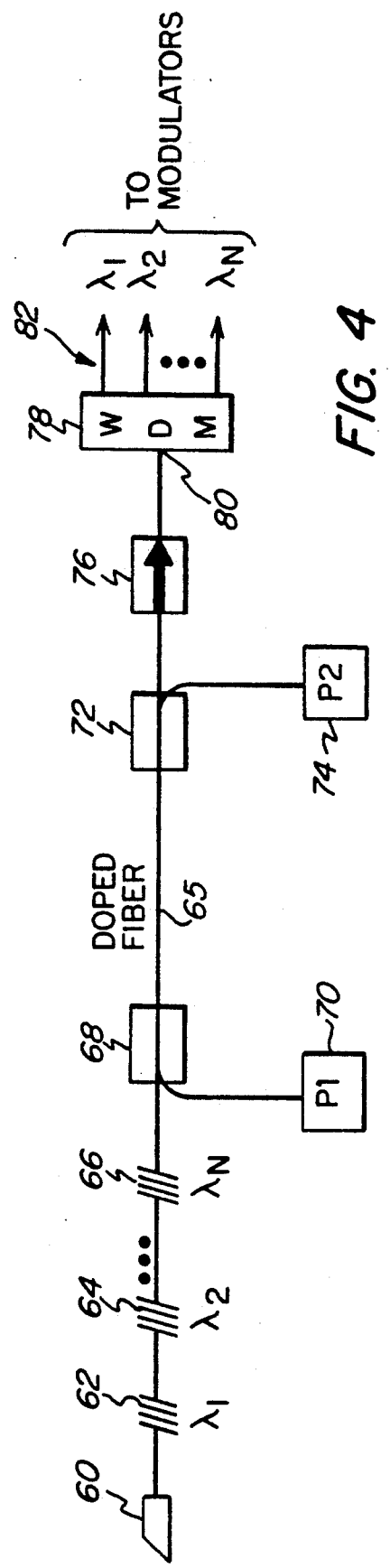
FIG. 4 is a schematic diagram of an alternate embodiment of the superluminescent source in which a plurality of carriers are generated.

FIG. 4 illustrates an embodiment of the present invention in which a plurality of optical carriers are generated. The operation of the superluminescent source is the same as that discussed in connection with FIG. 1. However, instead of a single grating 14 as shown in FIG. 1, the embodiment of FIG. 4 includes a plurality of gratings 62, 64, 66, each providing a different reflection band. Spontaneous emissions that are not reflected by reflectors 62, 64, or 66 are lost via slant polish connector 60. The reflected light is input back into doped fiber 65 via multiplexer 68. The doped fiber is pumped at one or both ends by pump lasers 70 and/or 74. Light output from the doped fiber 65 is coupled via multiplexer 72 to an optical isolator 76 that prevents the superluminescent source from lasing. A wavelength division multiplexer 78 is operated in a reverse direction, receiving the energy at its "output" terminal 80 for demultiplexing the individual carriers for output to a plurality of corresponding modulators as indicated at 82.

In the event that the external modulators receiving the carrier signals require polarized light, individual polarizers such as polarizer 28 illustrated in FIG. 1 can be used. Alternatively, the doped fiber 65 can incorporate a polarizer integrally therewith as well known in the art. Another way to provide a polarized output would be to use a highly birefringent doped fiber for the gain medium, e.g., a polarizing erbium fiber. Such techniques can also be used in the embodiment of FIG. 1 to eliminate the need for a separate polarizer 28.

FIG. 5 illustrates a superluminescent source in accordance with the present invention that is particularly well suited for use as a source of optical pump energy, e.g., for simultaneously pumping a plurality of active optical components such as optical amplifiers and/or lasers. When implemented with thulium doped fiber, the optical source outputs a wavelength of 1.46 $\mu$m which has a low fiber attenuation, i.e., exhibits a low loss as it travels through an optical fiber.

The like numbered components of FIG. 5 are identical to those discussed above in connection with FIG. 1, except that doped fiber 15 is advantageously a thulium doped fiber instead of an erbium fiber. An optical element 25 is provided at the output of the optical source, and can be either an optical isolator in the event that it is not desired for the doped fiber 15 to lase or a reflector if it is desired to establish a laser cavity so that doped fiber 15 will lase. For pumping at a short distance, it is desirable to run the pump source above the laser threshold so that lasing occurs to increase efficiency. The provision of a source that does not lase is required for pump energy that is to be communicated over an appreciable distance, so that the Brillouin threshold will not be reached. Stimulated Brillouin scattering is the first fiber non-linearity that results as the power in a fiber is increased.

Since Brillouin threshold is a function of pump spectral density, high power can be transmitted if the pump light has a moderately broad spectrum.

Typical Brillouin gain bandwidths are 40 MHz to 100 MHz. If the optical bandwidth of the pump is significantly wider than 40 MHz to 100 MHz, the Brillouin threshold as a function of transmitted pump power can be greatly increased. In accordance with the present invention, grating 14 (e.g., a fiber grating) is used to limit the spectrum of the source, while retaining efficient power conversion. It is desirable to limit the spectrum of the optical source when it is used to pump an optical amplifier, since the noise FIGURE of an optical amplifier is dependent on the wavelength of the pump light. The source linewidth is derived from the bandwidth of grating 14. Thus, when the pump is used to pump devices a significant distance away, it is desirable to use a grating having a moderately wide optical bandwidth to keep the spectral density below the Brillouin spectrum.

To provide additional output power for the superluminescent source, a cascade arrangement can be used as shown in FIG. 6. The structure of the device is identical to that illustrated in FIG. 5 (where optical element 25 is an optical isolator 24), with the addition of an optical fiber amplifier in series with the output of the optical isolator. The optical fiber amplifier comprises a doped fiber 94, such as a thulium doped fiber, that is pumped by either one or both of pump sources 100, 102. The ends 92, 96 of doped fiber 94 are coupled to the pump energy by conventional optical multiplexers 90, 98, respectively.

Thulium is a four level laser system. Thus, it may be convenient to use a dual core pump configuration for the thulium doped fibers. An example of a dual core configuration is illustrated in FIG. 7. Inner core 108 is the doped fiber. An outer core 106 is coupled to a pump source (e.g., pump source 18) and carries the pump energy for pumping the doped core 108. A conventional cladding 104 surrounds the outer core 106.

Those skilled in the art will appreciate that a problem that may be encountered with high power superluminescent sources is excess photon noise. One technique for eliminating such noise is disclosed in P.R. Morkel, R.I. Laming, H.0. Edwards, and D.N. Payne, "Elimination of Excess Photon Noise from Fiber Superradiant Sources", Paper CTUH76, CLEO 90, Anaheim, California, May 22, 1990.

It should now be appreciated that the present invention provides an optical source for use in providing, e.g., pump energy to one or more active optical components such as optical amplifiers and lasers. The source includes a gain medium such as a thulium doped fiber and a reflector for reflecting spontaneous emissions within a predefined band from the gain medium back into the medium for amplification and output. Lasing of the optical source is prevented, if desired, by an optical isolator coupled to the output thereof. An optical amplifier can be coupled to the output of the source to increase the power thereof.

Although the invention has been described in connection with various specific embodiments, those skilled in the art will appreciate that numerous adaptations and modifications may be made thereto, without departing from the spirit and scope of the invention as set forth in the claims.

What is claimed is:

1. An optical source comprising:
   a thulium doped optical fiber having an input end and an output end;
   means for pumping said doped fiber to cause spontaneous emission therein for output from said output end;
   reflector means for selectively reflecting light over a limited bandwidth encompassing a desired wavelength of said spontaneous emission; and
   means for optically coupling the input end of said doped fiber to said reflector means to reflect spontaneous emissions within said limited bandwidth exiting the input end of said doped fiber back into said doped fiber for output from said output end, without reflecting light outside of said bandwidth back into said doped fiber.

2. An optical source in accordance with claim 1 wherein:
said spontaneous emission has a bandwidth $\beta$; and
said reflector means are constructed to set said limited bandwidth to no more than about ten percent of the bandwidth $\beta$.

3. An optical source in accordance with claim 1 wherein said reflector means comprise an optical fiber grating.

4. An optical source in accordance with claim 3 wherein:
said spontaneous emission has a bandwidth and
said grating is constructed to set said limited bandwidth to no more than about ten percent the bandwidth $\beta$.

5. An optical source in accordance with claim 1 further comprising:
an optical amplifier coupled to the output end of said doped fiber for increasing the power provided by said optical source.

6. An optical source in accordance with claim 5 wherein said optical amplifier is a thulium doped fiber amplifier.

7. An optical source in accordance with claim further comprising:
optical isolator means coupled to the output end of said doped fiber for preventing the fiber from lasing.

8. An optical source in accordance with claim 1 further comprising:
optical isolator means coupled to the output end of said doped fiber for preventing the fiber from lasing.

9. An optical source in accordance with claim 1 wherein said desired wavelength is about 1.46 microns.

10. An optical source in accordance with claim 9 wherein said pumping means pump said thulium doped fiber at a wavelength of about 0.79 microns.

11. An optical source in accordance with claim 1 comprising a multicore optical fiber, wherein said doped optical fiber is provided as an inner core of said multicore fiber and said pump means include an outer core of said multicore fiber for carrying pump energy to said inner core.

12. An optical source in accordance with claim 1 further comprising:
reflector means coupled to the output end of said doped fiber for causing said fiber to lase.

13. An optical source comprising:
a doped optical fiber having an input end and an output end;
means for pumping said doped fiber to cause spontaneous emission therein for output from said output end, said spontaneous emission having a bandwidth $\beta$;
reflector means for selectively reflecting light over a limited bandwidth encompassing a desired wavelength of said spontaneous emission, said limited bandwidth being no more than about ten percent of the bandwidth $\beta$; and
means for optically coupling the input end of said doped fiber to said reflector means to reflect spontaneous emissions within said limited bandwidth exiting the input end of said doped fiber back into said doped fiber for output from said output end, without reflecting light outside of said bandwidth back into said doped fiber.

14. An optical source in accordance with claim 13 further comprising:
optical isolator means coupled to the output end of said doped fiber for preventing the fiber from lasing.

15. An optical source in accordance with claim 14 further comprising:
an optical amplifier coupled to the output end of said doped fiber for increasing the power provided by said optical source.

16. An optical source in accordance with claim 13 wherein said reflector means comprise an optical fiber grating.

17. An optical source comprising:
a doped optical fiber having an input end and an output end;
means for pumping said doped fiber to cause spontaneous emission therein for output from said output end;
reflector means for selectively reflecting light over a limited bandwidth encompassing a desired wavelength of said spontaneous emission;
means for optically coupling the input end of said doped fiber to said reflector means to reflect spontaneous emissions within said limited bandwidth exiting the input end of said doped fiber back into said doped fiber for output from said output end, without reflecting light outside of said bandwidth back into said doped fiber; and
an optical amplifier coupled to the output end of said doped fiber for increasing the power provided by said optical source.

18. An optical source in accordance with claim 17 wherein said reflector means comprise an optical fiber grating.

19. An optical source in accordance with claim 18 further comprising:
optical isolator means coupled to the output end of said doped fiber for preventing the fiber from lasing.

20. An optical source in accordance with claim 17 further comprising:
optical isolator means coupled to the output end of said doped fiber for preventing the fiber from lasing.

* * * * *